Figure 1:
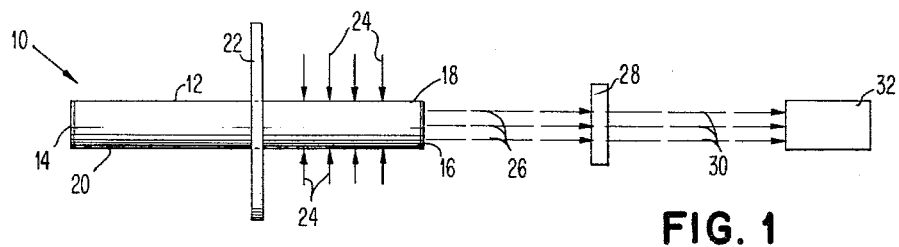

INVENTORS
PETER P. SOROKIN
MIREK J. STEVENSON

United States Patent Office 3,229,222
Patented Jan. 11, 1966

3,229,222
LASERS UTILIZING A RESONATOR
WITH A HEAT SINK
Peter P. Sorokin, Ossining, and Mirek J. Stevenson, Briarcliff Manor, N.Y., assignors to International Business Machines Corporation, New York, N.Y., a corporation of New York
Filed Nov. 24, 1961, Ser. No. 154,757
12 Claims. (Cl. 331—94.5)

This invention relates to improved optical masers or lasers and more particularly to improved resonators for optical masers or lasers.

The terms "optical maser" and "laser" are intended to be synonomous terms and are used to describe devices which by stimulated emission produce radiation in the infrared, visible or ultraviolet portions of the electromagnetic wave spectrum. The word maser is an acronym for microwave amplification by stimulated emission of radiation. When similar techniques are employed to produce waves within the optical region of the electromagnetic wave spectrum, the terms optical maser and laser are used, laser being an acronym for light amplification by stimulated emission of radiation. Optical devices of this type are capable of producing radiation which is highly directional, coherent and monochromatic.

In recent years a large amount of research and development work has been expended in attempting to develop lasers as indicated by the following publications: U.S. Patent 2,929,922, "Masers and Maser Communications System"; Nature, volume 187, page 493, August 1960, "Stimulated Optical Radiation in Ruby"; Physical Review Letters, volume 5, page 557, Dec. 15, 1960, "Stimulated Infrared Emission from Trivalent Uranium"; IBM Journal of Research and Development, volume 5, page 56, 1961, "Solid State Optical Maser Using Divalent Samarium in Calcium Fluoride."

The last three articles listed hereinabove relate to solid state lasers, that is, lasers employing resonators which have as their active element a crystal containing a suitable doping material wherein electromagnetic oscillations in the form of coherent radiation are produced. The resonator of a solid state laser generally includes an active element and means for repeatedly reflecting radiations produced in the active element. The resonator is sometimes referred to as the cavity of the laser.

The earliest known solid state laser is the so-called ruby laser which has an active element fabricated of aluminum oxide doped with chromium. Following the discovery of the ruby laser was the successful operation of lasers having as their active elements a crystal of calcium fluoride doped in one instance with trivalent uranium and in another instance with divalent samarium. In recent months lasers have been operated successfully using materials other than those mentioned hereinabove.

In the active element of the ruby laser the chromium atoms which provide the stimulated emission have predominantly three different energy states, that is, a ground state, a metastable state and an excitation state. The trivalent uranium and divalent samarium atoms present in the active elements of the calcium fluoride lasers have predominantly four energy states, that is, a ground state, an excitation state, a metastable state and an intermediate or terminating state. In the three energy level active elements fluorescence occurs between the metastable state and the ground state whereas in the four energy level active elements fluorescence occurs between the metastable state and the intermediate or terminating state, which latter state is somewhat above the ground state. When radiation energy of an appropriate frequency is applied to the active elements of the lasers the active atoms become excited and are in effect pumped from the ground state to the excitation state. The energy applied to the active elements which excites the atoms is referred to as pumping radiation. The atoms in the excitation state undergo a non-radiative transition when passing from the excitation state to the metastable state during which they give up energy to the crystal lattice. Fluorescent transition is then produced between the metastable state and the ground state in the three energy level active elements and between the metastable state and the terminating state in the four energy active elements. When the laser is in a quiescent state, that is when pumping power is not applied to the active element the population of the various states of the active elements is such that almost all of the doping atoms in the crystal are at the ground state. As is known in order to produce radiation by stimulated emission so as to realize a high intensity coherent output wave it is necessary to supply sufficient pumping energy to the active element to achieve a population inversion between the two states between which the fluorescence transition is produced in the active element. When the fluorescent transition is produced between the metastable state and the ground state it is necessary that a very large number, that is, more than half, of the doping or active atoms initially present in the ground state be pumped into the excitation state so that when, through the normal relaxation process in atoms, the atoms reach the metastable state the population of the atoms in the metastable state will be greater than the population of the atoms in the ground state. In the four energy level active element of the laser the intermediate or terminating state is normally essentially depopulated at the operating temperatures of these active elements. Accordingly, only relatively small numbers of active atoms need be pumped from the ground state to the excitation state in order to produce a population inversion between the metastable state and the intermediate or terminating state. It has been found that only about $\frac{1}{500}$ of the pumping power necessary to provide stimulated emission in the three energy active element is required to provide stimulated emission in the four energy level active element. Due to the high pumping power requirements of the three energy level active elements, such as the ruby active elements, these active elements become rapidly heated and thus produce only a pulse of coherent radiation. Since considerably less pumping power is necessary to provide stimulated emission in the four energy level active element there is considerably less heating of the four energy level active elements and, therefore, continuous wave operation is possible in the four energy level active element solid state lasers.

Even though it is possible to provide a continuous wave output from the four energy level active element lasers, it has been found that the pumping power necessary to provide stimulated emission in the four energy level active elements is still sufficiently great so as to eventually raise the temperature of the active element to such a level as to prevent the generation of continuous wave oscillations for an indefinite length of time.

The prior art resonators of the lasers have taken the form of a Fabry-Perot interferometer and are known as the Fabry-Perot resonators. The Fabry-Perot resonators have been shown and described in the above mentioned U.S. Patent 2,929,922 and commonly assigned copending U.S. patent applications Serial No. 73,878, now U.S. Patent No. 3,130,254, and Serial No. 75,296. In the Fabry-Perot resonators opposite ends of the active element are made parallel to each other and a reflective coating is applied thereto so as to repeatedly reflect the rays in the resonator between the two ends thereof. The reflective coating on at least one of the two ends is formed so as to permit a small portion of the radiations produced by stimulated emission to pass therethrough. The reflecting surface in the Fabry-Perot resonator has been provided by either applying a silver film to each of the opposite ends of the resonator or by using multiple dielectric layers.

A portion of the pumping radiation which is applied to the active element of the laser to excite the active atoms is absorbed by the crystal lattice and also by the reflecting surfaces to produce heat in the crystal which tends to raise the temperature thereof to a level above that at which the active element can produce coherent radiation. Heretofore, the pumping radiation or power has been applied at or above a predetermined threshold level to the entire surface of the active element between the two reflective surfaces. This radiation introduced a quantity of heat into the active element while it was being applied to the active element such that heat was being generated in the active element at a rate faster than it was being transferred out of the active element into the medium surrounding the active element to thus produce the undesirable increase in temperature in the crystal. To reduce the radiation level below the threshold level would not provide sufficient excitation in the active element to produce the stimulated emission.

It is an object of this invention to provide improved optical masers or lasers.

Another object of this invention is to provide improved resonators for lasers.

A further object of this invention is to provide improved solid state optical lasers.

Yet a further object of this invention is to provide improved lasers which produce a continuous output wave.

Yet another object of this invention is to provide lasers having resonators which will not heat up during the operation thereof to a point which renders the laser inoperative.

Still a further object of this invention is to provide a laser wherein heat within the laser is more readily transferred to its surrounding medium.

In accordance with the present invention an optical maser or laser is provided comprising a resonator which includes an active element having a first portion wherein stimulated emission is produced and a second portion forming a heat sink for permitting rapid flow of heat out of the first portion of the active element of the laser.

An important advantage of this invention is that a laser is provided wherein the temperature of the active element thereof can be continuously maintained at an operating level so as to produce a continuous output wave.

An important feature of the laser of the present invention is that the active element of the laser can be formed as a single crystal having an active portion to which pumping radiation is applied and an inactive portion which may either contain or not contain the doping or active atoms.

The foregoing and other objects, features and advantages of the invention will be apparent from the following more particular description of preferred embodiments of the invention, as illustrated in the accompanying drawings.

Figure 2:
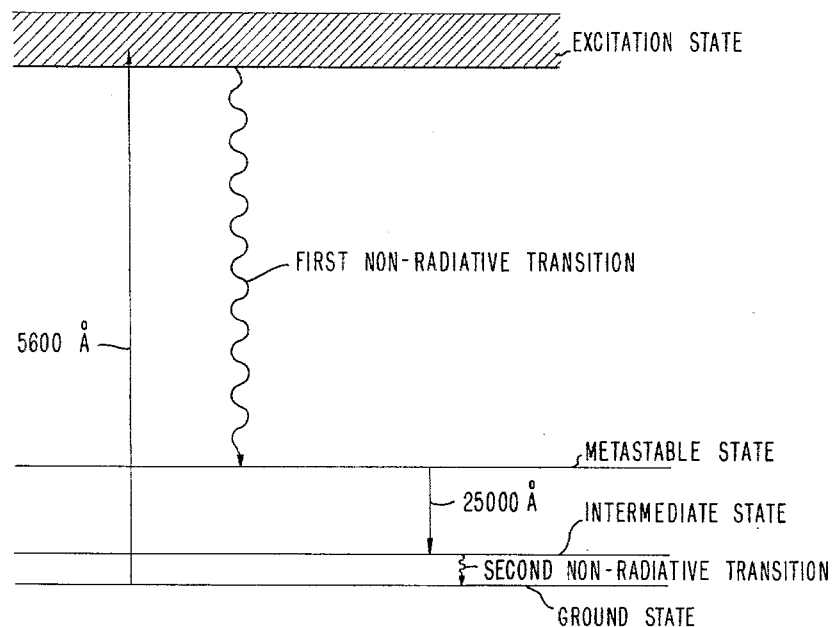
Figure 4:
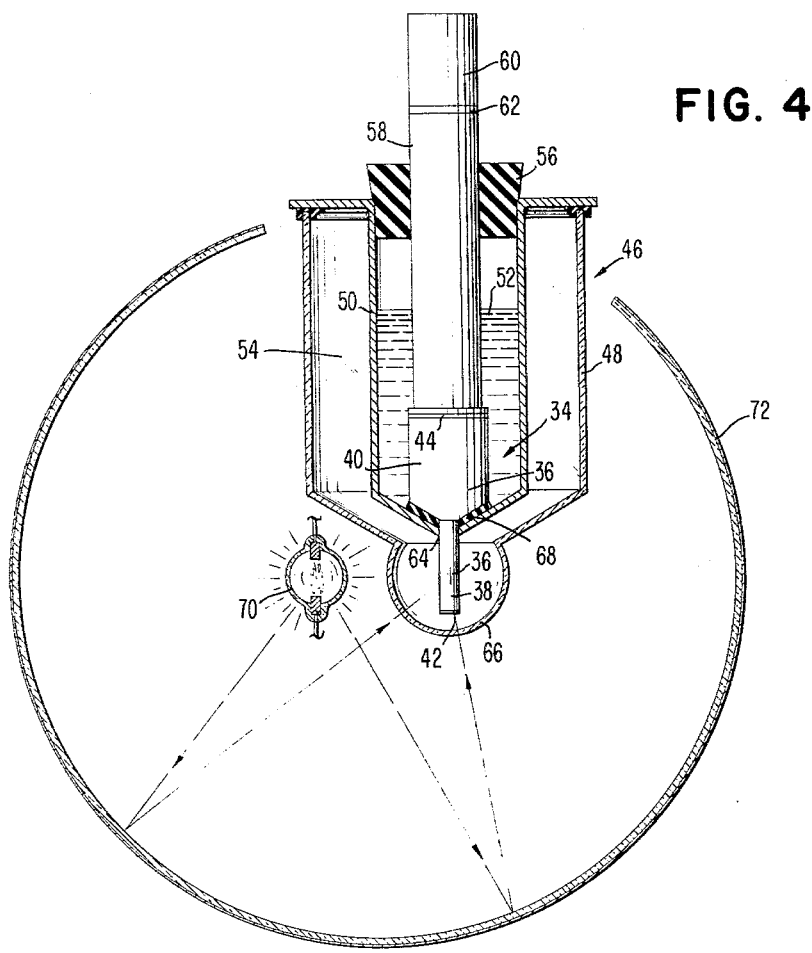
Figure 3:
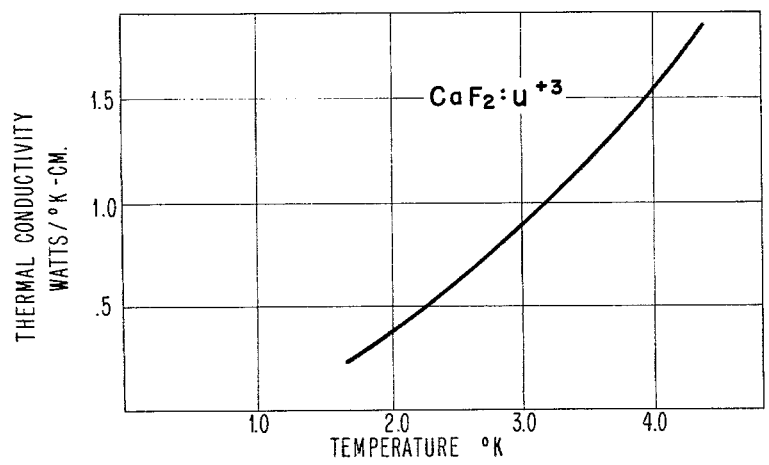

In the drawings:

FIG. 1 is a schematic diagram of an optical maser or laser illustrating the present invention, FIG. 2 is an energy level diagram indicating the characteristics of a crystal which may be used as the active element of the laser illustrated in FIG. 1, FIG. 3 is a graph indicating the thermal conductivity at low temperatures of an active element which may be used in the laser of the present invention, and FIG. 4 is a schematic representation of one embodiment of a laser of the present invention when operated at extremely low temperatures.

Referring to the drawings in more detail, FIG. 1 shows an embodiment of an optical maser or laser which may be used as a generator of highly directional, coherent and monochromatic electromagnetic waves of the optical portion of the spectrum. The generator comprises a resonator 10 which includes an active element in the form of a crystal 12 to the ends of which are applied first reflecting means 14 and second reflecting means 16. The first and second reflecting means are disposed so as to intercept luminous energy emanating from the crystal 12 and to return it to the crystal 12 so as to form a structure within which oscillations may be built up. The first reflecting means 14 is opaque, reflecting substantially all of the incident light intercepted thereby whereas the second reflecting means 16 is made to reflect a large percentage, for example, about 98.5% of the incident light intercepted thereby, and to transmit a very small percentage, for example, approximately 1.5% of the incident light. The crystal 12 includes an active portion 18 and an inactive portion 20, the active and inactive portions being defined by a light shield or mask 22 surrounding the crystal 12 at a position intermediate the ends thereof. Pumping radiation 24 emanating from any suitable source, such as a xenon discharge lamp, is applied to the surface of the active portion 18 of the crystal 12. The radiations produced in the resonator 10 which pass through the second reflecting means 16 provide a coherent output beam of radiant energy 26 which is intercepted by a filter 28, for example, a conventional interference filter or monochromator, for filtering out of the beam undesired radiation, such as background light, to pass only desired highly directional, coherent and monochromatic radiation 30 to a detector 32, for example a conventional phototube or photomultiplier. The crystal 12 of the resonator 10 in FIG. 1 may be any one of a number of known suitable crystals doped with appropriate atoms which, preferably, are of the four energy level type.

In FIG. 2 there is illustrated an energy level diagram of one of these four energy level lasers, namely, a calcium fluoride crystal doped with trivalent uranium when cooled to a temperature of approximately 4.2° K. As indicated in FIG. 2 atoms at the ground state are excited or pumped by radiation centered at a wavelength of 5600 A., that is, by green light, to elevate the atoms to the excitation state or level. Through a normal relaxation process the excited atoms in the excitation state give up energy to the crystal lattice, that is, to the calcium fluoride, while passing through a first non-radiative transition to a metastable state. The atoms at the metastable state then pass through a radiative or fluorescent transition between the metastable state and a termination or intermediate state in which there is produced coherent radiation having a wavelength of 25,000 A., i.e., infrared radiation. After the fluorescent transition the atoms in the intermediate state quickly return to the ground state where they may once again be excited or pumped by the 5600 A. pumping radiation to the excitation state.

In the operation of the laser of the present invention the crystal 12 is cooled to a suitable temperature and the pumping radiation 24, which lies within the absorption region of the electromagnetic wave spectrum for the trivalent uranium atoms, that is, in the green portion of the spectrum at approximately 5600 A., is directed onto the surface of the active portion 18 of the crystal 12 to produce in the active portion 18 the pumping transition of atoms from the ground state to the excitation state as indicated in FIG. 2 of the drawing. The light shield 22 is made of a material and positioned with respect to the crystal 12 so as to prevent any of the pumping radiation 24 from being applied to the surface of the inactive portion 20 of the crystal 12. The atoms in the active portion in the excitation state then undergo the first non-radiative transition between the excitation state and the metastable state which is followed by a fluorescent transition between the metastable state and the intermediate or terminating state in which coherent radiation having a wavelength of 25,000 A. is produced. Following the fluorescent transition the second non-radiative transition is produced between the intermediate state and the ground state. The coherent radiation produced in the crystal 12 in the fluorescent transition travels in all directions through the crystal 12, but of particular importance is the radiation traveling in a direction along or parallel to the longitudinal axis of the crystal 12. These latter rays are repeatedly reflected by the first and second reflecting means 14 and 16 to produce coherent radiation of considerable intensity. When the coherent radiation strikes the second reflecting means 16 a portion of this radiation passes through the second reflecting means 16 to form the output beam 26 which is intercepted by the filter 28 to produce the highly directional, coherent and monochromatic beam 30 which is detected by the detector 32.

In accordance with the present invention it has been found that in order for the laser to produce coherent radiation the crystal 12 need not be irradiated along the entire length thereof, that is, along the entire surface of the crystal between the first and second reflecting means 14 and 16. If the pumping radiation is concentrated on the crystal 12 so as to pass through only a given portion thereof and if the pumping radiation is of an intensity such that stimulated emission would occur in a Fabry-Perot resonator of a length equal to the given portion then stimulated emission will also occur in the longer crystal with the same distribution of pumping radiation, and, moreover, at about the same threshold value. The successful operation of the laser when the crystal thereof is irradiated along only a portion of its length is based upon the fact that the wavelength of simulated emission in a four energy level laser, such as, the calcium fluoride-trivalent uranium laser is too long to cause absorption transitions from the ground state in the unpumped portion of the crystal. Negligible light scattering is assumed in this portion of the crystal, and it should be maintained at a low temperature so that substantially all of the atoms in the unpumped portion of the crystal are in the ground state.

A laser having a calcium fluoride-trivalent uranium crystal maintained at a temperature of approximately 77° K. operated successfully when only a portion thereof having a 1/8" diameter and a length of 3/8" was irradiated by suitable pumping light and when the masked unpumped portion thereof had a diameter equal to 3/8" and a length equal to 1 1/8".

The thermal conductivity of insulating crystals at extremely low temperatures is very high and often exceeds that of metals. The thermal conductivity of undoped or pure calcium fluoride for a range of temperatures from 3° to 500° K. which includes the very low temperatures at which many lasers are operated is indicated in a graph produced by G. A. Slack shown in Physical Review, 122, 1451 (1961). In estimating the thermal conductivity of doped calcium fluoride optical maser crystals use can be made of this curve for temperatures greater than 77° K. since the thermal conductivity at high temperatures is determined by umklapp scattering and not by impurity or isotope effects. At temperatures below 77° K. the conductivity increases reaching a maximum in pure calcium fluoride of approximately 30 watts/cm.—deg. at about 14° K. However, in this region the thermal conductivity depends upon the amount of active impurity introduced into the crystal. In FIG. 3 of the drawing there is shown a graph of the thermal conductivity of a calcium fluoride crystal doped with .02 mol percent uranium plotted against temperature in degrees Kelvin in the range of approximately 1.7° K. to 4.4° K. The trivalent rare earth ions in the calcium fluoride crystal replace the divalent calcium atoms and charge compensation is effected by the presence of interstitial fluorine ions in adjacent sites. These ions appear to scatter photons effectively although the decrease in conductivity is not a linear function of concentration. The thermal conductivity indicated in FIG. 3 of the drawing, which varies from about 0.5 to 1.5 at these very low temperatures, is typical for the calcium fluoride crystals which have been successfully operated in optical masers or lasers.

In FIG. 4 there is illustrated one embodiment of an optical maser constructed in accordance with the principles of the present invention and operated at extremely low temperatures. This optical maser comprises a resonator 34 which includes a calcium fluoride crystal 36 doped with a suitable amount of trivalent uranium and having pumped portion 38 and an unpumped portion 40 and first reflecting means 42 applied to the end of the crystal 36 at the pumped portion and second reflecting means 44 applied to the opposite end of the crystal 36 at the unpumped portion 40. The resonator 34 is disposed in a Dewar 46 which has an outer container 48 and an inner container 50 which is partially filled with a cryogenic liquid, for example, liquid helium 52. A vacuum is maintained in the space 54 between the outer container 48 and the inner container 50. A suitable stopper 56 is provided to enclose the liquid helium 52 within the inner container 50. A hollow cylindrical tube 58 passing through the stopper 56 and the liquid helium 52 extends from the resonator 34 to a detector 60, which may be similar to detector 32 of FIG. 1. The tube 58 is securely attached at its lower end to the resonator 34 so as to prevent the liquid helium 52 from entering into the tube 58. A filter 62 which may be similar to filter 28 illustrated in FIG. 1 of the drawing is interposed between the tube 58 and the detector 60. An opening 64 is provided in the lower portion of the inner container 50 of the Dewar 46. The crystal 36 is inserted in the Dewar 46 so that the pumped portion 38 passes through the opening 64 to extend therefrom into the vacuum at the lower portion of the space 54 in a spherically shaped chamber 66, while the unpumped portion 40 remains within the inner container 50 in contact with the liquid helium 52. Suitable sealing means 68, such as, an epoxy resin is used between the lower portion of the inner container 50 and the crystal 36 to prevent the liquid helium 52 from passing through the opening 64. A source of pumping radiation 70, such as a compact lamp, for example, a xenon D.C. lamp, is provided for continuously supplying pumping radiation for the pumped portion 38 of the crystal 36. A hollow and substantially spherical mirror 72 having an internal reflecting surface is disposed around the pumping source 70 and the pumped portion 38 of the crystal 36 such that the center of a sphere defined by the internal surface of the spherical mirror 72 is located midway between the center points of the pump source 70 and the pumped portion 38 of the crystal 36. It can be seen that by arranging the pumping source 70 and the pumped portion 38 of the crystal 36 at equal distances from the sphere's center point, the image of the pumping source 70 is focused on the pumped portion 38 of the crystal 36 by the mirror 72 to provide an efficient means for applying pumping radiation to the surface of the pumped portion 38 of the crystal 36. In order to permit the radiation from the pumping source 70 to be applied to the pumped portion 38 of the crystal 36 through the outer container 48 of the Dewar 46, the outer container 48 including the portion thereof forming the chamber 66 is made of a material, such as glass, which is transparent to the pumping radiation. The inner container 50 is preferably made of a material which will not permit the transmission of radiation from the pumping source 70 therethrough. Thus, the inner container 50 acts as the shield or mask 22 shown in FIG. 1 of the drawing which prevents the application of pumping radiation to the unpumped portion of the laser crystal. The pumped portion 38 of the crystal 36 illustrated in FIG. 4 of the drawing has a relatively small diameter when compared to the diameter of the unpumped portion 40 of the crystal 36. It can be seen that the larger the diameter of the unpumped portion 40 of the crystal 36 the greater the surface thereof through which heat may be transferred from the crystal 36 into the liquid helium 52. Since the thermal conductivity of crystals, such as calcium fluoride crystals, is high at low temperatures the heat in the pumped portion 38 of the crystal 36 is readily conducted through the pumped portion 38 of the crystal 36 to the unpumped portion 40 which functions as a heat sink transferring the heat through its surface to the liquid helium 52.

In the operation of the laser illustrated in FIG. 4 of the drawings, the liquid helium 52 is introduced into the inner container 50 to cool the crystal 36 to a temperature in the vicinity of the liquid helium temperature of 4.2° K. With the crystal 36 maintained at this low temperature the pumping source 70 is turned on and pumping radiation or flux emanating therefrom is applied to the pumped portion 38 of the crystal 36 after being reflected from the internal surface of the spherical mirror 72. The pumping flux excites the trivalent uranium atoms in the calcium fluoride crystal to produce a population inversion between the metastable state and the intermediate state and, thus, by stimulated emission to produce coherent rays of about 25,000 A. These rays are built up in intensity by being repeatedly reflected by the first and second reflecting means 42 and 44. A portion of the high intensity coherent radiation is passed through the reflecting means 44 into the tube 58 to the filter 62 which permits only selected rays to pass to the detector or utilizing device 60. The pumping radiation or flux applied to the surface of the pumped portion 38 of the crystal 36 which produces the stimulated emission in the pumped portion 38 and also radiations from the pumping source 70 which although undesired are nevertheless also applied to the pumped portion 38 of the crystal 36 tend to heat the pumped portion 38 to a tempearture above the temperature of the liquid helium 52. If the temperature of the crystal 36 continued to rise beyond a critical point the laser operation would cease and coherent radiation would on longer be produced by the resonator 34. However, in accordance with this invention the heat produced within the pumped portion 38 of the crystal 36 is readily conducted through the crystal 36 to the unpumped portion 40 of the crystal 36 where it is transferred through the relatively large surface of the unpumped portion 40 to the liquid helium 52. By providing sufficient surface area on the unpumped portion 40 in contact with the liquid helium 52 the active portion 38 of the crystal 36 is continuously maintained at an operating temperature to thus provide continuous coherent waves at the output of the resonator 34.

When the flow of heat from the surface of a calcium fluoride crystal doped with trivalent uranium is equal to 1.2 watts per square centimeter or less it was found that the crystal is maintained at a constant temperature when immersed in liquid helium. When the dissipation of heat from the surface of the crystal exceeds 1.2 watts per square centimeter the temperature of the crystal rises due to the creation of a film impedance thereon. At 1.4 watts per square centimeter the temperature of the crystal increases to 15° K. and at 2 watts per square centimeter the temperature of the crystal is approximately 25° K. Thus, in order to maintain the temperature of the crystal at a constant low temperature the surface of the crystal should not dissipate more than about 1 watt per square centimeter.

Although liquid helium has been mentioned as the liquid used in the Dewar 46 it should be understood that crystals may be cooled to desired low temperatures by using other suitable cryogenic liquids, for example, crystals may be cooled to temperatures in the vicinity of 20° K. by using liquid hydrogen or liquid neon and to temperatures in the vicinity of 77° K. by using liquid nitrogen.

From the foregoing it can be seen that when the pumped portion of a crystal, for example, a calcium fluoride-trivalent uranium crystal, has a length of 1 centimeter and a diameter equal to ½ centimeter and when the pumping flux required to produce stimulated emission is on the order of 20 watts per square centimeter, continuous wave operation can be produced by providing a total surface area on the unpumped portion of the crystal of about 50 square centimeters. In such a crystal the temperature at the end of the pumped portion of the crystal adjacent the unpumped portion of the crystal would be at about 10° K. and the temperature at the end of the pumped portion remote from the unpumped portion would be at about 30° K. when the unpumped portion is immersed in liquid helium. From a study of the above mentioned Slack graph and the graph shown in FIG. 3 of the drawing, it can be seen that the mean thermal conductivity of the pumped portion is approximately 10 watts per centimeter-degree. Even if the heat produced by the total radiant energy applied to the surface of the pumped portion of the crystal is to be conducted through the pumped portion of the crystal to the unpumped portion of the crystal only $10\pi$ or 31.4 watts of energy need be conducted through the crystal, i.e., 160 watts per square centimeter at the end of the pumped portion adjacent the unpumped portion, and dissipated by the unpumped portion of the crystal. Accordingly, it can be seen that 50 square centimeters of crystal surface in contact with the liquid helium is more than an adequate area for maintaining the crystal at a low operating temperature.

The crystal of the present invention has been described as having a single unpumped portion functioning as a heat sink connected to one end of the pumped portion of the crystal, but it should be understood that the present invention includes resonators which may have two or more unpumped portions or heat sinks, for example, by coupling an unpumped portion to each end of the pumped portion of the crystal. It should also be understood that the cross-sectional area of either the pumped or unpumped portions of the crystal of the resonators of the present invention may have any convenient geometry, for example, circular or rectangular and the cross-section of each of the sections may be uniform or, for example, tapered. It should be further understood that the crystal of the resonators of the present invention is provided with one or more heat sinks which do not form an objectionable interface between the heat sink and the pumped portion of the crystal which would tend to act as a heat barrier tending to prevent the transmission of heat from the pumped portion of the crystal to the heat sink. Furthermore, it should be noted that the unpumped portion or heat sink may be composed of the same material as the pumped portion of the crystal, that is, the unpumped portion may even include the same type and amount of doping as in the pumped portion, particularly, if four energy level atoms are used.

Accordingly, improved resonators have been provided in which heat formed in the pumped portion of the crystal of the resonator is readily carried away therefrom so as to maintain the temperature of the crystal at operation levels for an indefinite period of time to provide lasers producing continuous output waves..

While the invention has been particularly shown and described with reference to preferred embodiments thereof, it will be understood by those skilled in the art that various changes in form and details may be made therein without departing from the spirit and scope of the invention.

What is claimed is:

1. A laser comprising a resonator including an active element, means for applying pumping radiation to only a relatively small portion of said active element to produce population inversion and resulting stimulated emission in said resonator and means for deriving coherent radiation from said resonator.

2. A laser comprising a resonator including an active element having a given surface area, means for applying pumping radiation to a portion of said given surface area to produce population inversion and resulting simulated emission therein, means for preventing said pumping radiation from passing through a substantial portion of said active element and means for deriving coherent radiation from said resonator.

3. A laser comprising a resonant cavity including an active element having a given surface area, means for applying pumping radiation to one portion of said given surface area to produce population inversion and resulting stimulated emission therein, means for masking another portion of said given surface area to prevent the application of said pumping radiation to said another portion and means for deriving coherent radiation from said cavity.

4. A laser comprising a resonant cavity including an active element having a first portion and a second portion coupled to said first portion in which heat from said first portion is dissipated, means for applying pumping radiation to only said first portion and means for deriving said coherent radiation from said cavity.

5. A laser comprising a resonant cavity including an active element having a first portion and a second portion disposed in the path of said coherent radiation in which heat from said first portion is dissipated, means for applying pumping radiation to only said first portion and means for deriving the coherent radiation from said cavity.

6. A laser comprising a resonant cavity including an active element having first and second portions, means for applying pumping radiation to only said first portion, said second porting being coupled to said first portion to receive heat from said first portion and to pass coherent radiations therethrough and means for deriving the coherent radiations from said cavity.

7. A resonator for a laser comprising a solid state active element having parallel first and second end surfaces and first and second contiguous portions serially aligned between said end surfaces, said first portion having a given cross-sectional area parallel to said end surfaces and said second portion having a cross-sectional area parallel to said end surfaces substantially greater than that of said given cross-sectional area, and first and second reflecting means applied to said first and second end surfaces, respectively.

8. A laser comprising a resonant cavity including an active element having a first portion and a second portion coupled to said first portion to receive heat therefrom, a cryogenic liquid, said second portion of said active element being immersed in said cryogenic liquid, means for applying pumping radiation to said first portion, means for masking said second portion to prevent the application thereto of said pumping radiation and means for deriving the coherent radiations from said cavity.

9. A laser comprising a resonator including an active element, means for inverting the population at only one end portion of said active element to produce stimulated emmission therein and means for deriving coherent radiation from said resonator.

10. A laser comprising a resonator including a single crystal element having an active portion and an inactive portion disposed on one side of said active portion, means for exciting only said active portion so as to produce radiations therein by stimulated emission and means for extracting said radiations from said active portion.

11. A laser comprising a resonant cavity including an active element having a first portion and a second portion coupled to said first portion to receive heat therefrom, a cryogenic liquid, said second portion of said active element being immersed in said cryogenic liquid, means for applying pumping energy only to said first portion for producing coherent radiation therein and means for extracting said coherent radiation from said cavity.

12. A resonator for a laser producing coherent radiation comprising a single crystal element having an active portion and an inactive portion disposed on one side of said active portion and first and second means for reflecting said radiations, said active portion being disposed between said first and second reflecting means, at least a section of said inactive portion being disposed between said active portion and one of said reflecting means.

References Cited by the Examiner
UNITED STATES PATENTS

| | | | |
|---|---|---|---|
| 2,929,922 | 3/1960 | Schawlow et al. | 250—199 |
| 3,055,257 | 9/1962 | Boyd et al. | 331—94.5 |
| 3,087,374 | 4/1963 | Devlin et al. | 331—94.5 |

OTHER REFERENCES

Ciftan et al.: "A Ruby Laser With an Elliptic Configuration," Proc. of the IRE, May 1961, volume 49, No. 5, pages 960 and 961.

Kaiser et al.: "Fluorescence and Optical Maser Effects in $CaF_2:SM^{+2}$," Physical Review, volume 123, No. 3, Aug. 1, 1961, pages 771 and 772.

JEWELL H. PEDERSEN, *Primary Examiner.*